United States Patent
Ketteler et al.

(10) Patent No.: US 7,735,387 B2
(45) Date of Patent: Jun. 15, 2010

(54) SELECTOR DRIVE FOR AUTOMATIC MANUAL TRANSMISSION OF MOTOR VEHICLES

(75) Inventors: Karl-Hermann Ketteler, Markdorf (DE); Andreas Fuessl, Kressbronn (DE); Bernd Schepperle, Constance (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 563 days.

(21) Appl. No.: 11/660,811

(22) PCT Filed: Jul. 14, 2005

(86) PCT No.: PCT/EP2005/007648

§ 371 (c)(1),
(2), (4) Date: Feb. 22, 2007

(87) PCT Pub. No.: WO2006/024344

PCT Pub. Date: Mar. 9, 2006

(65) Prior Publication Data

US 2008/0015086 A1  Jan. 17, 2008

(30) Foreign Application Priority Data

Aug. 28, 2004 (DE) .................. 10 2004 041 753

(51) Int. Cl.
*F16H 59/04* (2006.01)
(52) U.S. Cl. ........................................ 74/335
(58) Field of Classification Search ............... 74/473.12
See application file for complete search history.

(56) References Cited

U.S. PATENT DOCUMENTS

| 4,595,865 | A | 6/1986 | Jahns |
| 4,777,419 | A | 10/1988 | Obradovic |
| 5,150,629 | A | 9/1992 | Morris et al. |
| 5,199,325 | A | 4/1993 | Reuter et al. |
| 5,291,115 | A | 3/1994 | Ehsani |

(Continued)

FOREIGN PATENT DOCUMENTS

| DE | 42 30 326 A1 | 3/1993 |
| DE | 43 04 250 C1 | 6/1994 |
| DE | 101 43 325 A1 | 3/2003 |
| DE | 102 15 116 C1 | 7/2003 |

(Continued)

*Primary Examiner*—Sherry L Estremsky
*Assistant Examiner*—Edwin A. Young
(74) *Attorney, Agent, or Firm*—Davis & Bujold, P.L.L.C.

(57) ABSTRACT

A selector drive for automatic manual transmissions has an electric motor, the rotational motion of which can be transmitted to the selector mechanism for the selection of a selector position by way of a mechanical transmission chain. An electric motor (1) of the mechanical transmission chain is an electric motor with defined step width, whereby the required step number for the selection of the selector position in the selector mechanism can be determined through fixed geometrical conditions or distances according to the stipulations of the individual step angle of the electric motor and the distance between the selector positions.

13 Claims, 2 Drawing Sheets

U.S. PATENT DOCUMENTS

| | | | |
|---|---|---|---|
| 5,701,064 A * | 12/1997 | Horst et al. | 318/701 |
| 5,929,590 A | 7/1999 | Tang | |
| 6,003,395 A | 12/1999 | Rogg et al. | |
| 6,857,981 B2 | 2/2005 | Hori et al. | |
| 7,155,328 B2 | 12/2006 | Kötter et al. | |
| 2003/0227271 A1 * | 12/2003 | Shindo | 318/439 |
| 2004/0254040 A1 | 12/2004 | Somschor et al. | |

FOREIGN PATENT DOCUMENTS

| | | |
|---|---|---|
| DE | 103 33 092 A1 | 3/2004 |
| EP | 0 603 071 A2 | 6/1994 |
| EP | 0 771 066 A1 | 5/1997 |
| EP | 0 864 782 A1 | 9/1998 |
| EP | 0 898 099 A2 | 2/1999 |

* cited by examiner

SELECTOR DRIVE FOR AUTOMATIC MANUAL TRANSMISSION OF MOTOR VEHICLES

This application is a national stage completion of PCT/EP2005/007648 filed Jul. 14, 2005, which claims priority from German Application Serial No. 10 2004 041 753.9 filed Aug. 28, 2004.

FIELD OF THE INVENTION

The present invention concerns a selector drive for automatic manual transmissions of motor vehicles. The invention further relates to a method for the selection of a selector position in the selector mechanism of an automatic manual transmission of a motor vehicle.

BACKGROUND OF THE INVENTION

The automation of transmission functions is acquiring increasing significance; automatic manual transmissions, which demonstrate such automation, present the advantage, that the driver is relieved of the task of changing gears in the vehicle. Thereby, a generally more comfortable and safer operation is made possible. Furthermore, automatic manual transmissions present significant cost advantages. In this regard, when clutch movement occurs, a translational movement is normally transferred to the release bearing of the clutch through a corresponding electro-mechanical actuator according to the state of the technology. Similar configurations are also used for shifting automation, whereby for selection and shifting two kinematically independent movements are necessary, which are conducted by electromechanical transmission discs in the manner of the state of the technology.

Electro-mechanical actuators are also used for shifting between two wheel drive and four wheel drive for partially four wheel driven vehicles. For example, from DE 42 30 326 A1 an electronic selector mechanism for vehicle transmissions is known, in which an intermediate gear for a four wheel drive presents two separate electronic movement mechanisms, namely a regional movement mechanism and a clutch movement mechanism. In this regard, a regional movement mechanism serves to shift the intermediate gear between an upper region, a neutral position, and a lower region; the clutch movement mechanism controls the engagement of a clutch between two wheel drive, automatic drive, and four wheel drive. According to DE 42 30 326 A1, the regional movement mechanism comprises an electric motor, which is constructed co-axially relative to an output shaft of the intermediate gear, as well as a linear screw, to convert the rotational movement of the motor shaft selectively into an axial movement of the regional sliding clutch.

The electrical drive for the selector function in an automatic manual transmission is normally realized with a brush motor. In this regard the rotational movement of the brush motor is converted to a translational movement with a transmission (spindle, worm gear, gear rack), which leads directly to shifting direction selection; it is also possible that through the translational movement, a slotted lever is moved for the preliminary selection of a certain path for the shifting action.

The selector lever movement is a movement with little force requirement, whereby only the frictional torque and moment of inertia within the selector mechanism must be overcome, so that the conversion of the motor's rotational movement into a translational movement known, according to the state of the technology, is comparatively expensive for this purpose.

Furthermore, the requirements for positioning in the current shifting direction, depending on the configuration and number of shifting directions, are quite high and require a sufficient of resolution of sensor elements as well as an exact algorithm for positioning. The usually selected conversion between motor rotational movement and translational movement has the goal of keeping the requirement on the resolution of a movement sensor technically realizable; the realization of high conversion is connected in a disadvantageous manner with high constructive expenditure.

The present invention has the task of reporting a selector drive for automatic manual transmissions of motor vehicles, which avoids the disadvantages of the state of the technology. In particular, simple positioning should be made possible and the constructive expenditure should be reduced. Moreover, a method for the selection of a selector position in the selector mechanism of an automatic manual transmission of a motor vehicle is reported, which is especially suitable for the operation of the selector drive according to the invention.

SUMMARY OF THE INVENTION

Accordingly, it is suggested that for the realization of the selector function with automatic manual transmissions, an electric motor with a defined step width be used, the rotational movement of which can be transmitted by means of a mechanical transmission path to the selector mechanism for the selection of a selector position, whereby by means of established geometrical conditions or distances between the selector position in the selector mechanism the necessary step number for the selection of a particular selector position can be determined according to the defined individual step angle of the electric motor and of the distance between the selector positions.

Within the framework of an especially advantageous implementation form, it is suggested that a switched reluctance motor (SRM) be used, whereby the production costs can be further reduced.

The established geometrical conditions or distances between the selector positions in the selector mechanism can establish the necessary step number according to the individual step angle of the electric motor and of the distance between the selector positions. After the selection procedure, only feedback is still necessary, with which the attainment of the intended position can be verified. In an advantageous manner, electric motors are used, which can return their own positions to a sensor or control without additional expenditure, so that the constructive expenditure is further reduced.

Through the conception according to the invention, the positioning is realized through the physical characteristics of the motor with defined step width, whereby the expenditure of a separate position recognition system is no longer necessary. In order to realize this, certain conditions for the distance between selector positions must be met.

Within the framework of an especially advantageous implementation, it is suggested that the distances between the selector positions be configured in such a way that these can be divided by a largest common factor (ggT≧1). A special case of this configuration consists of the selector positions being set equidistant; in this case a 1:1 relationship of positions of the electric motor to selector positions in the selector mechanism and other simplifications of the control are achieved.

According to the invention, for selection, an electric motor rotational movement is generated, which occurs in fixed, physically defined, and exactly reproducible steps, whereby the necessary step number is determined from the largest common factor ggT of the distances between the selector positions. The step number is a whole number multiple of the largest common factor.

Because of the rotational symmetry of electric motors required by the principle, step motors and switched reluctance motors are especially suitable for the generation of the necessary electric motor rotational motion.

BRIEF DESCRIPTION OF THE DRAWINGS

The invention will now be described, by way of example, with reference to the accompanying drawings in which.

DETAILED DESCRIPTION OF THE INVENTION

Figure 1:
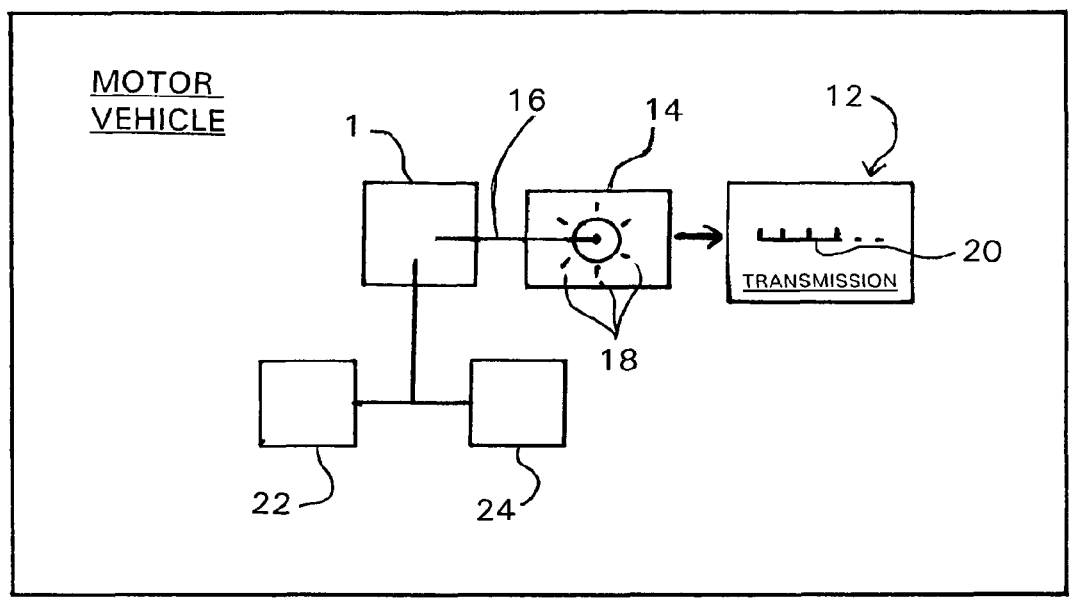
FIG. 1 is a diagrammatic representation of a motor vehicle with an automated transmission and a selector mechanism with a selector drive and a mechanical transmission path.

In FIG. 1 is shown a diagrammatic representation of a motor vehicle 10 including an automated transmission 12 having a selector mechanism 14 driven by a selector drive 1 and mechanical transmission path 16 wherein rotation of the selector drive 1, which in a presently preferred embodiment comprises a reluctance stepper motor, through step rotational angles α moves selector mechanism 14 through selector positions 20 to select corresponding gear ratios of the automated transmission 12.

Figure 2:
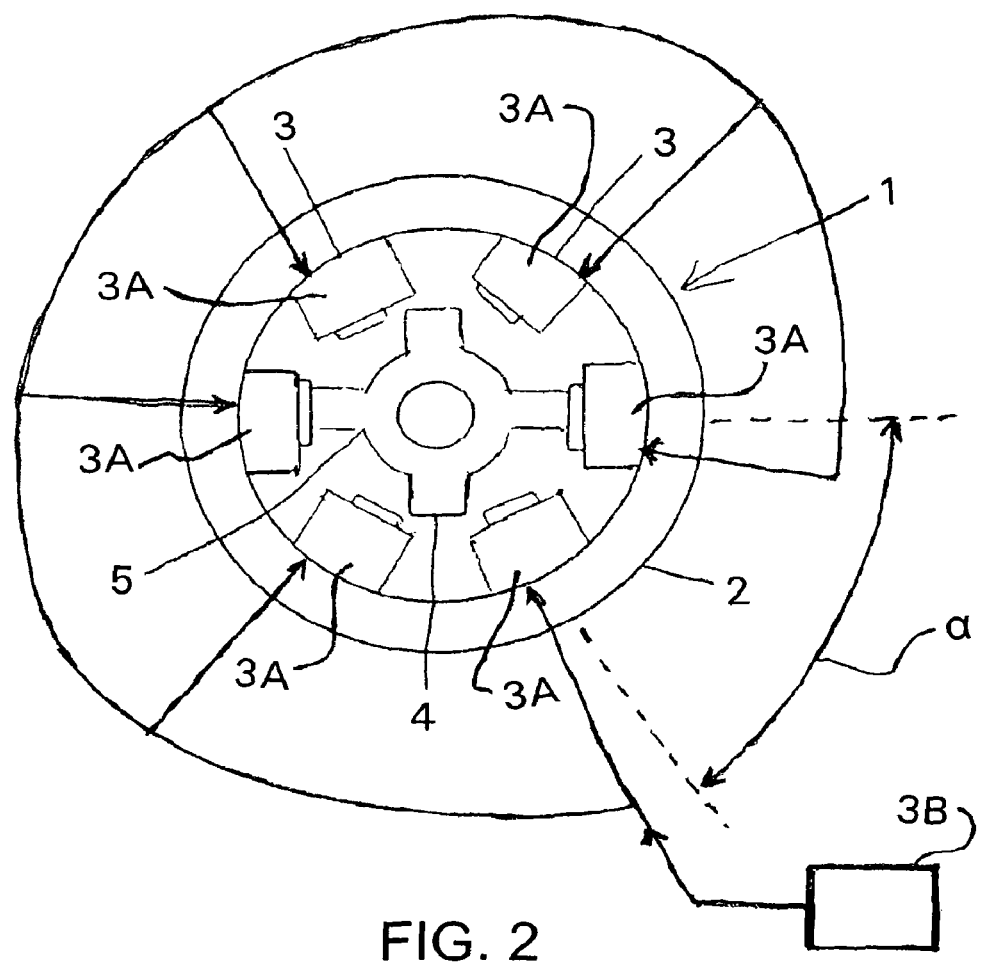
FIG. 2 is a schematic cross-sectional view of a switched reluctance motor.

In FIG. 2 is shown a cross-sectional view of a switched reluctance motor 1 is shown; the motor surrounds a stator 2, surrounding poles 3 with coils 3A driven by driving source 3B, and a rotor 4 serving as a drive, which presents teeth 5. In the figure the stator presents six poles, and the rotor presents four teeth. The stepwise movement of the rotor is achieved by a circular current flow through the coils in which the stator poles are contained.

Through the selection of the pole number in rotor P2 and the groove number of the stator N1, the individual step angle φ of a switched reluctance motor can be determined as the smallest common multiple (kgV) of N1 and P2 according to the following equation:

$$\varphi = \frac{360}{kgV(N1, P2)}$$

When a phase or a pole of the stator of the switched reluctance motor is permanently provided with a current, the rotor places itself in a defined position and has approximately the behavior of a torsion spring. This position, which is converted by means of the mechanical transmission path to the selector mechanism, corresponds according to the invention to a desired selector position of the selector mechanism.

The physical principle of the reluctance motor is based on the relationship:

$$T = \frac{1}{2} I^2 * \frac{dL}{d\alpha},$$

whereby L is the self inductivity of the current-conducting coils, α is the rotation angle of the rotor, I is the current, and T is the attainable torque.

The motor torque thus arises in that the self inductivity of the current-conducting coils changes with the rotational angle of the rotor. The zero torque stage occurs in the positions of maximal and minimal inductivity, so that in the target position the maximal inductivity is yielded.

The coil resistance remains constant. From this it arises that the electrical time constant of each coil changes with the rotational angle of the rotor. The maximal value of this time constant is reached in the target position, in other words, after the required number of steps. Accordingly, it is suggested according to the invention that the self inductivity of the stator coils be measured for position determination. This can occur, for example, through current increase or current drop in the target coil; in this manner by measurement of the current increase or current drop time, it can be determined whether the rotor is located in the expected target position.

As an example, the current after the switching off of the driving current source in a free wheeling circuit after approximately 30%-100% of the electrical time constant can be measured and compared with a previously determined expected value. If the expected value is attained, then the target position has been reached; if the expected value is not attained, the target position has not yet been reached. In order to take into consideration temperature changes of the motor, the expected value of the current is calculated dependent on the motor temperature as determined by a temperature sensor 22 of temperature sensor and controller 24.

When, as a result of the configuration of the selector mechanism, no equidistant distribution of the selector positions arises, but rather a distribution in which the distances between the selector positions are configured in such a manner that these can be divided by a largest common factor (ggT>1), or if, for example, a translational step is provided between the electric motor and the selector mechanism, so that no logical 1:1 relationship between the positions of the electric motor and the selector lever positions of the selector mechanism arises, an additional feedback sensor can be necessary in order to signal the attainment of the target position.

Through the solution, according to the invention, the advantage is achieved that an expensive position regulation system is no longer necessary, since the electric motor occupies a precise zero position after each step.

Through the use of a switched reluctance motor, in addition, a simple and robust construction is made possible. Furthermore, a reluctance motor can be driven in an advantageous manner in transmission oil without additional sealing measures, in contrast to other motor technologies (for example brush motors).

The operation of the motor as a positioning drive under oil has the additional advantage that the transient response in the target position is influenced positively by the viscous damping of the oil. Through this damping, the engagement of the motor is shortened, whereby the activation time is reduced.

According to the invention, it is also possible to employ a motor with defined step width in connection with a suitable geometrical configuration in other areas of automobile technology, in order to convert an electrical motor rotational movement into a defined translational movement.

REFERENCE NUMERALS

1 switched reluctance motor
2 stator
3 pole
4 rotor
5 tooth

The invention claimed is:

1. A selector drive for an automated manual transmission of a motor vehicle, the selector drive comprising:
   an electric motor having a defined step width,
   rotational movement of the electric motor is transferable, via a mechanical transmission path connected between the electric motor and a selector mechanism for selection of a selector position whereby rotation of the electric motor, and corresponding movement of the mechanical transmission path, moves the selector mechanism between selector positions, and the selector position being determinable by the defined step width of the electric motor; and
   at least one of known individual step angles of the electric motor and distances between the selector positions in the selector mechanism determine a number of steps of the electric motor required for selection of a specific selector position,
      wherein one of an increase in electric current and a decrease in electrical current in a target coil determines a position of the electric motor, a value of the electrical current is measured at a preset time after turning off a driving source of the electrical current, and the value of the electrical current is compared with a value corresponding to the specific selector position in the selector mechanism for determining whether a rotor of the electric motor is located in an expected specific position.

2. The selector drive for the automatic manual transmission according to claim 1, wherein the selector positions in the selector mechanism are configured such that when distances between the selector positions are divided by a largest common factor of the distances between the selector positions, the number of steps of the electric motor required for the selection of the specific selector position in the selector mechanism is a whole number multiple of the largest common factor.

3. The selector drive for the automatic manual transmission according to claim 1, wherein the selector positions in the selector mechanism are equidistant to provide a one-to-one relationship of positions of the electric motor to the selector positions in the selector mechanism.

4. The selector drive for the automatic manual transmission according to claim 1, wherein the electric motor is one of a step motor and a switched reluctance motor.

5. The selector drive for the automatic manual transmission according to claim 1, wherein the value of the electrical current corresponding to the specific position of the rotor of the electric motor is determined by a temperature of the electric motor.

6. The selector drive for the automatic manual transmission according to claim 1, wherein the electric motor is immersed in transmission oil of the automated transmission.

7. A method of selecting a selector position in a selector mechanism of an automatic manual transmission of a motor vehicle, the method comprising the steps of:
   transferring rotational movement from an electric motor, via a mechanical transmission path, to the selector mechanism for selecting selector positions in the selector mechanism, with the rotational movement from the electric motor taking place in fixed, physically defined and exactly reproducible steps; and
   determining a number steps of rotational movement from the electric motor for selecting a certain selector position; and
   employing at least one of individual step angles of the electric motor and distances between the selector positions in the selector mechanism to determine a number of steps of the electric motor required for selection of a specific selector position;
   measuring a value of one of an increase of electrical current and a decrease of electrical current in a target coil at a predetermined time after turning off a driving source of the electrical current;
   comparing the measured value of one of the increase of electrical current and the decrease of electrical current with a predetermined value; and
   recognizing, when the measured value of one of the increase of electrical current and the decrease of electrical current is substantially equal to the predetermined value, the certain selector position of the selector mechanism has been achieved.

8. The method of selecting the selector position in the selector mechanism according to claim 7, further comprising the step of configuring the distances between the selector positions in the selector mechanism, such that when dividing the distances between the selector positions in the selector mechanism by a largest common factor $ggT \geq 1$ of the distances between the selector positions, the number of steps of the electric motor required for the selection of the selector position is a whole number multiple of the largest common factor ($ggT \geq 1$).

9. The method of selecting the selector position in the selector mechanism according to claim 8, further comprising the step of equidistantly arranging the selector positions in the selector mechanism to provide a one-to-one relationship of positions of the electric motor and the selector positions in the selector mechanism.

10. The method of selecting the selector position in the selector mechanism according to claim 7, further comprising the step of employing one of a step motor and a switched reluctance motor as the electric motor.

11. The method of selecting the selector position in the selector mechanism according to claim 7, further comprising the step of communicating, via the electric motor, rotational positions of the selector mechanism to one of a single sensor and a single control.

12. The method of selecting the selector position in the selector mechanism according to claim 7, further comprising the step of determining the measured value of one of the increase of electrical current and the decrease of electrical current by measuring a temperature of the electric motor which is due to resistance in a coil of the electric motor.

13. The method of selecting the selector position in the selector mechanism according to claim 7, wherein the electric motor is immersed in transmission oil of the automated transmission.

* * * * *